United States Patent
Vlatis

(10) Patent No.: US 11,278,043 B2
(45) Date of Patent: Mar. 22, 2022

(54) PASTA WITH REDUCED GLUTEN

(71) Applicant: General Mills, Inc., Minneapolis, MN (US)

(72) Inventor: Roula Vlatis, Melbourne (AU)

(73) Assignee: General Mills, Inc., Minneapolis, MN (US)

( * ) Notice: Subject to any disclaimer, the term of this patent is extended or adjusted under 35 U.S.C. 154(b) by 1008 days.

(21) Appl. No.: 15/503,927

(22) PCT Filed: Aug. 3, 2015

(86) PCT No.: PCT/IB2015/055870
§ 371 (c)(1),
(2) Date: Feb. 14, 2017

(87) PCT Pub. No.: WO2016/027191
PCT Pub. Date: Feb. 25, 2016

(65) Prior Publication Data
US 2017/0273339 A1  Sep. 28, 2017

(30) Foreign Application Priority Data
Aug. 20, 2014  (AU) ................ 2014903268

(51) Int. Cl.
| *A23L 7/109* | (2016.01) |
| *A23L 29/212* | (2016.01) |
| *A23L 29/269* | (2016.01) |
| *A23L 33/10* | (2016.01) |
| *A23L 29/238* | (2016.01) |

(52) U.S. Cl.
CPC ........... *A23L 7/11* (2016.08); *A23L 7/109* (2016.08); *A23L 7/111* (2016.08); *A23L 29/212* (2016.08); *A23L 29/238* (2016.08); *A23L 29/269* (2016.08); *A23L 33/10* (2016.08); *A23V 2002/00* (2013.01)

(58) Field of Classification Search
USPC ........................... 426/557, 451, 516
See application file for complete search history.

(56) References Cited

U.S. PATENT DOCUMENTS

| 4,208,439 | A | * | 6/1980 | Hsu ............. A23L 7/109 426/242 |
| 5,124,168 | A | * | 6/1992 | McMillin ........ A23L 7/111 426/451 |
| 6,551,645 | B1 | * | 4/2003 | Hauser ............ A23L 7/109 426/557 |

(Continued)

FOREIGN PATENT DOCUMENTS

| ES | 2 474 920 | 7/2014 |
| WO | 1997/29648 | 8/1997 |

OTHER PUBLICATIONS

Huang, J. et al., "*Model Prediction for Sensory Attributes of Nongluten Pasta*", Journal of Food Quality, vol. 24, pp. 495-511, (2001).

(Continued)

*Primary Examiner* — Lien T Tran
(74) *Attorney, Agent, or Firm* — Diederiks & Whitelaw, PLC; John L. Crimmins, Esq.

(57) ABSTRACT

A filled gluten-free or low-gluten pasta product, such as ravioli, tortellini, agnolotti or the like, wherein said pasta incorporates a low-gluten or gluten free flour and xanthan gum and is produced by cold extrusion.

9 Claims, 1 Drawing Sheet

(56) References Cited

U.S. PATENT DOCUMENTS

| | | | | |
|---|---|---|---|---|
| 2007/0031564 A1* | 2/2007 | Fontanesi | ............ | A23L 29/212 |
| | | | | 426/557 |
| 2009/0252844 A1* | 10/2009 | Skinner | .................. | A23L 7/109 |
| | | | | 426/285 |
| 2010/0310747 A1 | 12/2010 | Paulus et al. | | |
| 2015/0010686 A1* | 1/2015 | Lacina | .................. | A23L 29/225 |
| | | | | 426/557 |

OTHER PUBLICATIONS

Gluten-free pasta dough, http://www.jamieoliver.com/recipes/pasta-recipes/gluten-free-pasta-dough/#S11goSg60XPtPUyX.97 (May 2014).
Fresh Gluten-Free Pasta, www.epicurious.com/recipes/food/iews/fresh-gluten-free-pasta-362249 (Nov. 2010).

\* cited by examiner

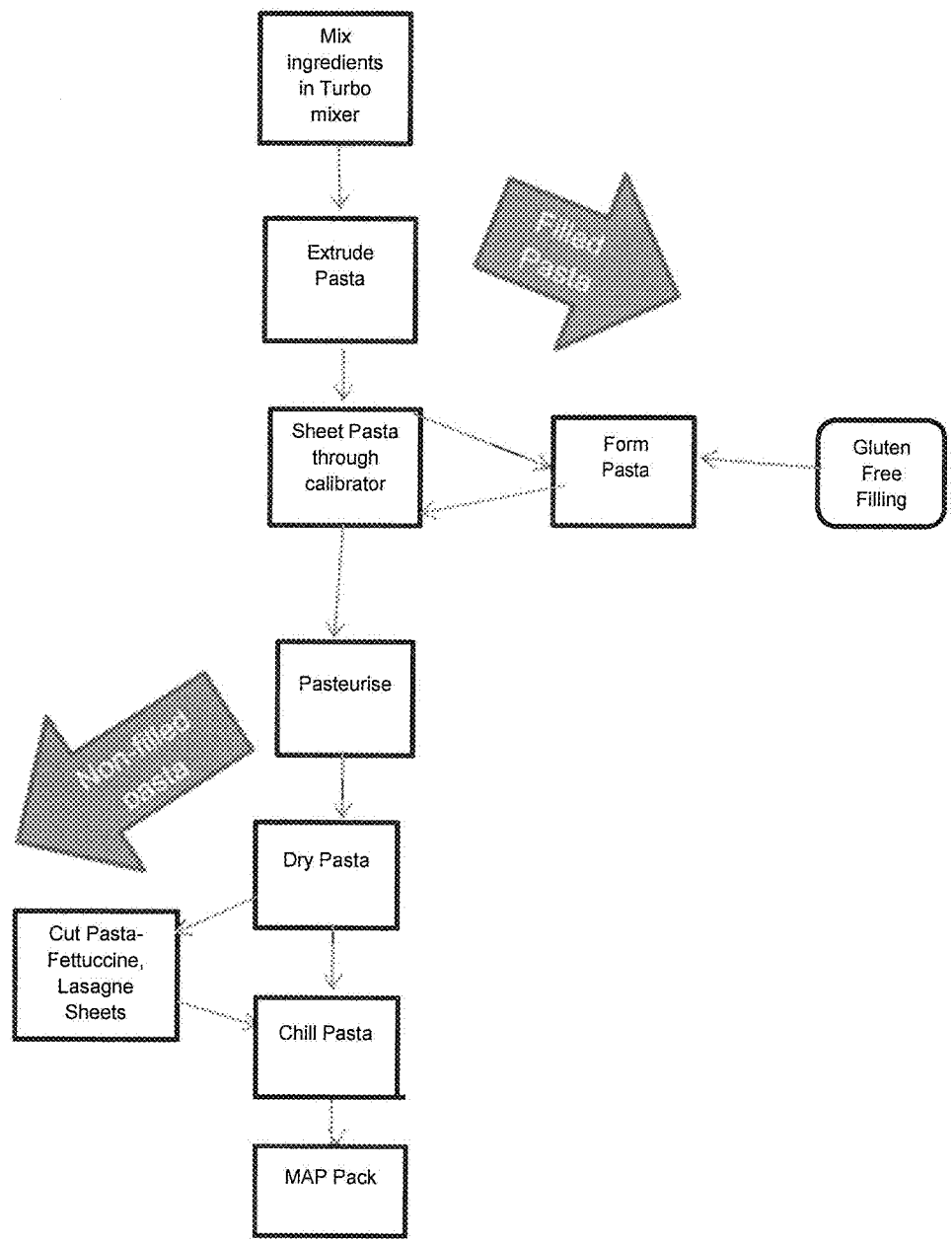

PASTA WITH REDUCED GLUTEN

CROSS-REFERENCE TO RELATED APPLICATIONS

This application represents a National Phase application of International Patent Application No. PCT/IB2015/055870, filed Aug. 3, 2015, entitled "Pasta with Reduced Gluten", pending. The entire contents of this application is incorporated herein by reference.

TECHNICAL FIELD

The invention relates to the field of commercial fresh or chilled pasta manufacture. In particular, the invention relates to pasta products having a reduced level of gluten.

BACKGROUND OF THE INVENTION

Gluten is a protein that is found in grains such as wheat, rye, barley and oats. Traditionally, those genetically predisposed to coeliac disease, which involves an intolerance to dietary gluten wherein digested gluten can cause damage to the bowel, are prescribed gluten-free diets.

However, gluten-free or gluten-reduced foods are increasingly popular in commercially prepared foods for those who do not suffer from that condition, as there is a belief that gluten can cause other digestive issues. This has led to an increased demand for the supply of a variety of food products that are less likely to cause such problems due to reduced gluten levels.

In order to meet this demand for gluten-reduced or gluten-free food products, there are significant challenges for the food manufacturer. Gluten is an effective water-binder and develops a strong and resilient protein matrix in a foodstuff when water is added and the gluten is subjected to mixing.

This is particularly important in the developing the texture and shape of the gluten-containing foodstuff. For example, in the making of bread, the mixing of the dough causes the gluten in the bread to develop, which provides the matrix that supports the formation of the open texture of bread.

Accordingly, replacement of the physical role of gluten in a foodstuff is a difficult task. This is especially so for the manufacturer of pasta products, wherein the gluten plays an important role in providing the resilient texture of the pasta, especially in terms of structure and stretch. This is especially difficult for 'fresh' chilled pasta products, and even more difficult for a fresh filled pasta, wherein there is a meat or vegetable filling that must be contained within the pasta. This is because filled pasta cannot be made in a dry form, as the higher water-activity of the filling will tend to degrade the product overall.

The manufacturing process requires the pasta to stretch around the filling, which requires that the pasta itself is not susceptible to tearing or breaking. If this occurs, the product will be unacceptable for sale.

Accordingly, it is an object of the invention to provide a commercially manufacturable gluten-free or reduced-gluten pasta that ameliorates at least some of the problems associated with the prior art.

SUMMARY OF THE INVENTION

According to a first aspect of the invention, there is provided a filled gluten-free or low-gluten pasta product, such as ravioli, tortellini, agnolotti or the like, wherein said pasta incorporates a low-gluten or gluten free flour and xanthan gum and is produced by cold extrusion. The pasta may further incorporate guar gum.

The gluten-free or low gluten flour may be constituted in a number of ways. It may be a grain flour that has had gluten reduced or removed, or it may be a mixture of protein-free or low-protein grain or vegetable starches and gums.

A pasta made according to the invention described above is likely to have better quality and texture than the gluten-free or gluten-reduced pasta known in the prior art, and the pasta is less likely to be susceptible to the tearing or cracking that has been found in the prior art.

More preferably, the xanthan gum comprises between 2.0% and 3.0% of the pasta. This has been found to provide an optimal result with respect to pasta resilience and texture.

Preferably, the pasta further incorporates other advantageous carbohydrate ingredients, including: rice flour; potato starch and/or tapioca starch. A particularly desirable result is achieved with the incorporation of at least 10% by mass of fresh egg.

According to a second aspect of the invention, there is provided a method of manufacturing filled gluten-free or low-gluten pasta product, such as ravioli, tortellini, agnolotti or the like, wherein said pasta incorporates a low-gluten or gluten free flour and xanthan gum, said method incorporating the steps of mixing all raw materials; cold extruding said mixture into sheets, preferably at an extruder temperature of ≤34° C. and preferably at an extruder pressure of ≥75 Bar; and adding the pasta filling to the pasta and forming the pasta into the desired shape.

This process has been found to produce a particularly satisfactory gluten-free or gluten-reduced pasta.

Now will be described, by way of a specific, non-limiting example, a preferred embodiment of the invention with reference to the drawings.

BRIEF DESCRIPTION OF THE DRAWINGS

FIG. 1 is a flowchart of a process for manufacturing a pasta product according to the invention.

DETAILED DESCRIPTION OF THE INVENTION

The invention may be embodied by a cold-extrusion reduced-gluten or gluten-free filled pasta product. In this specification, 'fresh' denotes a pasta product that has a moisture content above about 28%. Such pasta products require chilled storage conditions at below 4° C. for maximum commercial shelf-life, as opposed to 'dry' pasta product that has a water content of at or below about 12.5% and is stable indefinitely at room temperature.

Because of the higher water content, the fresh pasta is more pliable, and also more liable to tear or break if stretched, such as may happen during the process of sheeting and forming the pasta around a filling.

Filled pastas are those that contain a non-pasta filling surrounded by pasta material. Common forms of filled pasta are ravioli, tortellini, agnolotti or the like, and are well-known in the art.

Two formulations have been developed and proven in trials: one for plain pasta and one for filled pasta. These are given below in tables 1 and 2.

TABLE 1

Plain Pasta

| Ingredient | % by mass |
|---|---|
| Rice Flour | 35.65 |
| Corn Starch | 18.54 |
| Potato Starch | 7.71 |
| Xanthan Gum | 2.83 |
| Whole Egg Pulp | 11.45 |
| Salt | 0.97 |
| Water | 25.53 |
| Colouring | 0.02 |
| TOTAL | 100 |

TABLE 2

Filled Pasta

| Ingredient | % by mass |
|---|---|
| Rice Flour | 35.28 |
| Corn Starch | 18.72 |
| Potato Starch | 5.20 |
| Xanthan Gum | 2.83 |
| Whole Egg Pulp | 11.45 |
| Water | 26.5 |
| Colouring | 0.02 |
| TOTAL | 100 |

These combinations of ingredients produce products having appearance, flavour and texture very similar to standard fresh pasta products.

Rice flour and corn starch were chosen in combination to form the basis of the pasta product. These ingredients are relatively bland in flavour. Other flours used in some products, such as chickpea and buckwheat, can produce an undesirable 'cardboard'-like flavour.

As the gluten-free pasta dough tends to be quite short in texture, the xanthan gum acts like gluten giving the pasta dough some structure and flexibility.

It has been observed that the egg tends to help all the ingredients bind together, and gives the specific bite to the pasta. It also helps to contribute positively to the pasta colour.

In combination with the xanthan gum and egg, the potato starch has been observed to give the pasta dough the structure and clean bite required to meet sensory expectations upon cooking and consumption.

A large amount of trial work was done with different raw materials and variations in raw material levels to determine the right balance to achieve successful process capability of dough and final product quality.

Varying levels of xanthan gum were trialled. The best results were achieved with the addition of 2.83% by mass in the dough formulation for function and quality. It is anticipated that good results could be achieved with xanthan gum addition of up to about 3% by mass.

Varying levels of fresh egg pulp were trialled. The presence of the egg pulp gives the pasta a texture that differentiates the final product from e.g. shelf stable pasta, which is particularly important in the context of an otherwise low-protein formulation (due to the absence of gluten). The results indicated that at least 10% by mass fresh egg pulp needs to be added to the pasta dough formulation to achieve acceptable functionality and quality in the resulting pasta.

Different kinds of modified potato starches were trialled to determine the difference in capability and end product quality they provided, when compared with standard potato starch. Due to the filled pasta requiring better stretch during processing, a specialised modified potato starch was sourced from Paselli, a division of Avebe, and the end product quality in terms of texture was acceptable. This modified potato starch is pre-gelatinised and has a smaller particle size than the potato starch used in the plain pasta, represented by 100% of the starch grains passing through a 355 micron sieve.

Some investigation was made into alternative ingredients for the pasta dough formulation. Both xanthan gum and guar gum are used in gluten free products. Xanthan gum tends to produce a product that is more similar to gluten, in terms of producing the most similar product texture. The use of xanthan gum produces a dough which is more pliable and light, whereas guar gum produces a thinner more stringy dough. Use of xanthan gum tends to produces a better quality dough.

Potato starch and tapioca starch (made from manioc root), are larger-grained starches that gelatinize at relatively lower temperatures. Potato starch and tapioca starch seem to be interchangeable in gluten free formulations.

A large amount of trial work was done with extruder temperatures and pressures to determine the right balance between processing capability of the gluten free pasta dough and final product quality.

Pilot trials identified that an extrusion temperature of 32° C. provided the best conditions for dough extrusion for plain pasta, and 25.7° C. for filled pasta. At significantly higher extrusion temperatures the starch in the pasta dough tends to begin gelatinising. This is undesirable as it can cause the dough to 'stick' to the extruder screw.

Extrusion at a pressure of less than 60 Bar was trialled, however the gluten-free pasta dough product did not extrude well at this pressure. The relatively high level of moisture in the pasta dough tended to cause the dough to break apart.

Extrusion at a pressure of greater than or equal to 80 Bar worked well in extruding the gluten-free pasta dough for plain pasta, and 39.8 Bar for twin-sheet extrusion for filled pasta products. It has been identified that there is a need to balance the moisture of the dough versus the extruder pressure to achieve production of the best quality pasta product.

A detailed description of a process for producing a reduced gluten or gluten-free pasta product is given as follows, with reference to FIG. 1.

For the production of plain gluten-free pasta: the raw materials are fed into a high-speed mixer and mixed until homogeneous; dough exiting the mixer is fed directly into a cold extruder; a pasta sheet is extruded from the extruder at a pasta temperature of 32° C. and about 80 Bar; the pasta sheet is fed through a calibrator to achieve get the required sheet thickness (typically about 1.0-1.1 mm); the pasta is then pasteurised; the pasta is then dried; the pasta is then chilled, cut to size and packed in modified atmosphere (MAP) packaging.

For the production of filled gluten-free pasta: the raw materials are fed into a high-speed mixer and mixed until homogeneous; dough exiting the mixer is fed directly into a cold extruder; a pasta sheet is extruded from the extruder at a pasta temperature of 25.7° C. and about 39.8 Bar; the pasta sheet is fed through a calibrator to achieve get the required sheet thickness (typically about 1.1-1.2 mm); the pasta and the (gluten-free) filling material are fed into a former and the product is formed to shape and filled; the pasta is then pasteurised; the pasta is then dried; the pasta is then chilled, and packed in modified atmosphere (MAP) packaging.

The cold extrusion can, for example, be successfully performed on extruder press equipment of the type available from Pavan Group SpA, of Via Monte Grappa 8, 35015-Galleria Veneta PD Italy.

It will be appreciated by those skilled in the art that the above described embodiment is merely one example of how the inventive concept can be implemented. It will be understood that other embodiments may be conceived that, while differing in their detail, nevertheless fall within the same inventive concept and represent the same invention.

The invention claimed is:

1. A method of manufacturing a gluten-free pasta product, wherein said pasta product incorporates a gluten-free flour and xanthan gum, said method incorporating the steps of:
    mixing at least the gluten-free flour and the xanthan gum to form a mixture;
    cold extruding said mixture to form pasta sheets; and
    forming the pasta product with a desired shape from the pasta sheets, wherein the pasta product has a moisture content above 28%, the pasta product is a non-filled pasta product, the extrusion temperature is 32° C., and the pressure is 80 Bar.

2. A method of manufacturing a gluten-free pasta product, wherein said pasta product incorporates a gluten-free flour and xanthan gum, said method incorporating the steps of:
    mixing at least the gluten-free flour and the xanthan gum to form a mixture;
    cold extruding said mixture to form pasta sheets; and
    forming the pasta product with a desired shape from the pasta sheets, wherein the pasta product has a moisture content above 28%, the extrusion temperature is in the range 25-26° C., and the pressure is in the range 39-40 Bar, the method further comprising adding a pasta filling to the pasta product such that the pasta product is a filled pasta product.

3. The method of claim 2, wherein the pasta product further incorporates guar gum.

4. The method of claim 3, wherein the pasta product further incorporates rice flour.

5. The method of claim 4, wherein the pasta product further incorporates potato starch or tapioca starch.

6. The method of claim 5, wherein the pasta product further incorporates at least 10% by mass of fresh egg.

7. The method of claim 6, wherein the xanthan gum comprises between about 2.0% and about 3.0% of the pasta product.

8. The method of claim 7, wherein the pasta product further incorporates 25% or 26% by mass of water.

9. A method of manufacturing a gluten-free pasta product, wherein said pasta product incorporates a gluten-free flour and xanthan gum, said method incorporating the steps of:
    mixing at least the gluten-free flour and the xanthan gum to form a mixture;
    cold extruding said mixture to form pasta sheets, wherein cold extruding the mixture into the sheets includes cold extruding the mixture into the sheets at a temperature of ≤34° C. and at a pressure of ≥75 Bar; and
    forming the pasta product with a desired shape from the pasta sheets, wherein the pasta product has a moisture content above 28%.

* * * * *